Figure 1:
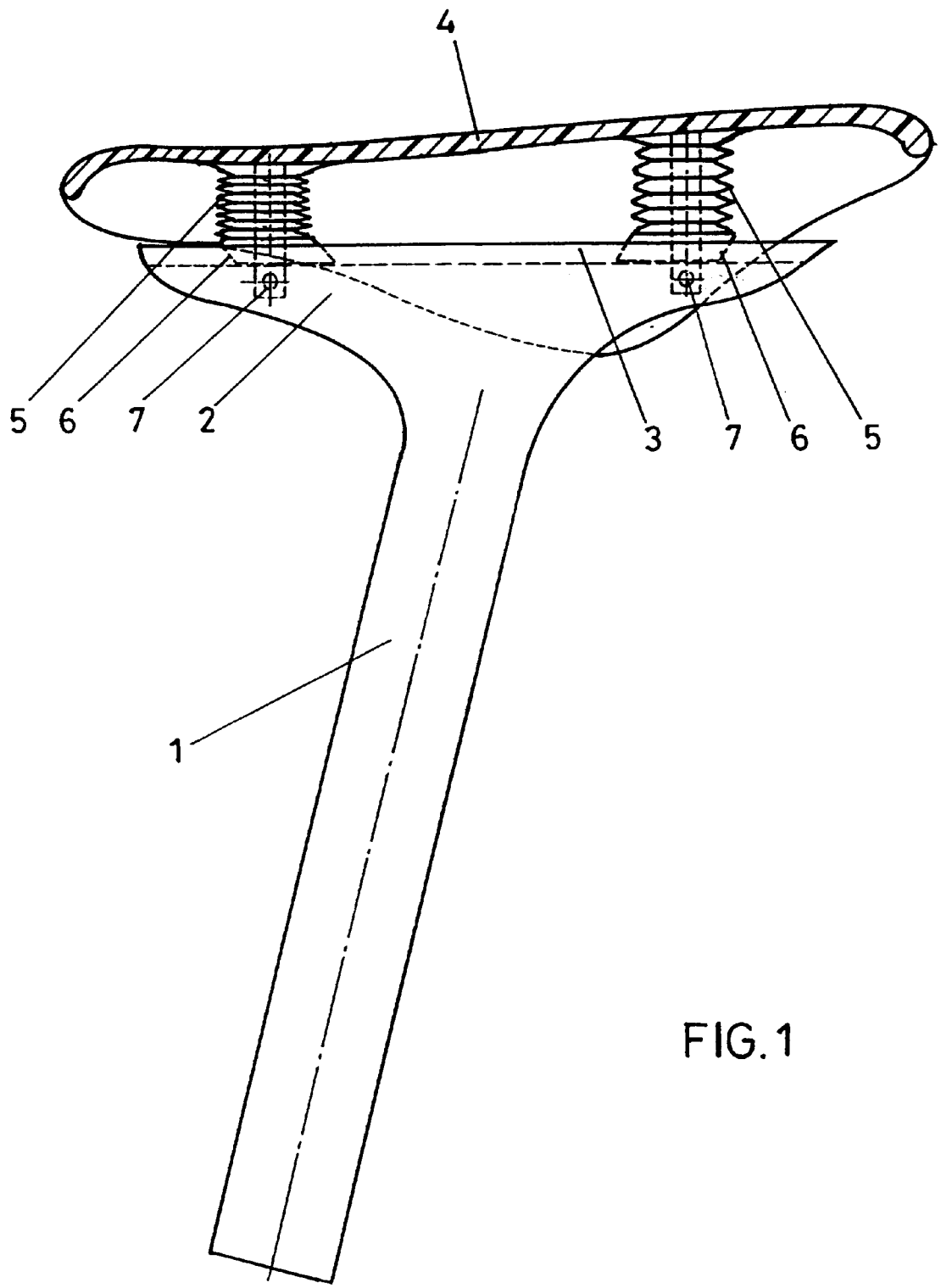

United States Patent
Brauchart

[11] Patent Number: 5,957,527
[45] Date of Patent: Sep. 28, 1999

[54] SADDLE STRUCTURE

[75] Inventor: Erwin Brauchart, Graz, Austria

[73] Assignee: Spengle Hochleistungskunststofftechnik Ges.m.b.H., Austria

[21] Appl. No.: 08/894,381
[22] PCT Filed: Dec. 19, 1995
[86] PCT No.: PCT/AT95/00245
§ 371 Date: Aug. 18, 1997
§ 102(e) Date: Aug. 18, 1997
[87] PCT Pub. No.: WO97/22512
PCT Pub. Date: Jun. 26, 1997

[51] Int. Cl.[6] .................................................. B62J 1/06
[52] U.S. Cl. ............................... 297/215.13; 297/215.14; 297/338
[58] Field of Search ............................ 297/195.1, 209, 297/215.13, 215.14, 215.15, 311, 313, 344.13, 344.12, 337, 338; 248/188.2

[56] References Cited

U.S. PATENT DOCUMENTS

| | | | |
|---|---|---|---|
| 4,693,627 | 9/1987 | Borromeo | 297/215.15 |
| 4,772,069 | 9/1988 | Szymski . | |
| 4,836,604 | 6/1989 | Romano | 297/215.14 |
| 4,983,063 | 1/1991 | Phillips | 297/215.14 |
| 5,364,160 | 11/1994 | Fritschen et al. . | |
| 5,443,331 | 8/1995 | Lai . | |
| 5,466,042 | 11/1995 | Herman | 297/195.1 |

FOREIGN PATENT DOCUMENTS

| | | | |
|---|---|---|---|
| B341344 | of 0000 | Austria . | |
| 2398659 | 2/1979 | France | 297/215.13 |
| A3 2585318 | 6/1986 | France . | |
| A 2 589 120 | 4/1987 | France . | |
| A 2 616 733 | 12/1988 | France . | |
| C 92850 | 7/1897 | Germany . | |
| U 86 15 919 | 7/1986 | Germany . | |
| U 90 12 974 | 11/1990 | Germany . | |

*Primary Examiner*—Anthony D. Barfield
*Attorney, Agent, or Firm*—Nixon & Vanderhye P.C.

[57] ABSTRACT

A saddle construction for a bicycle includes a seat pillar having a saddle support portion and a saddle adjustably mounted on the saddle support portion. A first height adjustment device extends between the saddle and the saddle support portion and is located in a forward region of the saddle for adjusting the height of the forward region of the saddle relative to the saddle support portion. A second height adjustment device also extends between the saddle and the saddle support portion and is located in a rearward region of the saddle for adjusting the height of the rearward region of the saddle. The first and second height adjustment devices operate independently of each other to separately adjust the height at the forward and rearward regions of the saddle.

12 Claims, 5 Drawing Sheets

SADDLE STRUCTURE

The invention relates to a saddle structure for bicycle saddles, in particular sport saddles, comprising a fastening part capable of being adjusted relative to a seat pillar.

With bicycle saddle structures, it is common to connect the same with the seat pillar in a manner so as to be pivotable about a pivot axis extending transverse to the seat pillar. Usually, toothed discs are used as fastening parts, which allow for the stepwise adjustment of the inclination of the saddle relative to the seat pillar. Furthermore, common saddle fastenings allow for height adjustments relative to the seat pillar, wherein the fastening part usually is connected with a tube portion inserted in the seat pillar and fixed within the seat pillar in a positive and force-transmitting manner by clamping. By such a known configuration of the fastening part, adjustment in terms of both inclination and height is basically feasible. Yet, such an adjustment, as a rule, requires tools and allows for a limited adjustability only, the comfort of the saddle, thus, being not always ensured.

The invention aims at providing a saddle structure comprising a fastening part which enables the particularly easy and simple regulation and fine adjustment of saddle settings. In addition, the invention aims at providing more freedom for any intended adjustment in order to thereby obtain a more precise fine adjustment and a higher comfort. To solve this object, the configuration according to the invention essentially consists in that the saddle structure comprises at least two separate means for adjusting the height in the front and rear regions of the saddle. By at least two separate means being provided for adjusting the height in the front and rear regions of the saddle, concerted adaptation may be obtained in a particularly simple manner and, as a rule, substantially more quickly. In principle, one of these two means for adjusting the height might be the known pivotability of the saddle. Such a pivotability, however, only provides for the simultaneous lifting or lowering in a front or rear region and lowering and lifting, respectively, in the respective opposite region. It is only the additional separate means provided for adjusting the height on the respective opposite side, that allows for fine adjustment substantially raising the comfort. In a particularly simple manner, the height-adjustable means may be designed as supports or bolts including spring and/or dampening elements, wherein such supports or bolts are each arranged in the front and rear regions of the saddle in order to ensure appropriate fine adjustment.

In order to further improve the precise adjustment required for the optimum comfort, the configuration advantageously is devised such that the fastening part capable of being adjusted relative to the seat pillar is designed as a slide displaceable transverse to the axis of the seat pillar in the longitudinal direction of the saddle. By such an additional displacement relative to the saddle, the optimum position relative to the handlebar may be adjusted and, in such an optimum position, the inclination of the saddle may be set with a view to obtaining the best comfort. With the hitherto known adjustment means, the subjective distance relative to the handlebar was adjusted at the same time by appropriately tilting the saddle about an axis extending transverse to the axis of the seat pillar, which, of course, could not simultaneously result in an improved comfort of the saddle. It is only by the separation of the two functions of adjustment relative to the handlebar as well as adjustment of the saddle in the correct position relative to the handlebar, that a substantial enhancement of the comfort of the saddle has become feasible.

Advantageously, the configuration according to the invention is devised such that the height-adjustable supports are designed as screw spindles, thereby rendering adjustment particularly quick and simple. In order to be able to apply also large adjustment forces quickly and safely without resorting to the aid of tools, the configuration advantageously is devised such that the height-adjustable supports are adjustable via eccentric discs or wedge surfaces and are secured in their respectively adjusted positions. In particular, when using rotatable wedge surfaces, adjustment may be effected in a quick and reliable manner by simply pivoting a lever without requiring tools therefor.

For the correct adjustment of the saddle relative to the handlebar of a bicycle, the configuration advantageously is devised such that the slide is displaceable in a linear guide, such as, e.g., a dovetail guide, in the longitudinal direction of the saddle. By means of such a slide even large forces can be taken up safely, simple adjustment as well as simple blocking of the respectively selected position being feasible by simple means. Advantageously, the configuration in this respect is devised such that the supports pass through the slide and that the slide is secured in its displacement position by means of the eccentric discs or wedge surfaces securing the adjustment position of the supports.

In order to safely guide such a slide and safely take up the respective eccentrical forces, the configuration advantageously is devised such that the seat pillar in the region of the fastening of the saddle structure comprises a supporting surface or guide extending in the longitudinal direction of the saddle. A particularly simple and, at the same time, comfort-enhancing resilient configuration of such a supporting surface in a simple manner may be devised such. that the supporting surface of the seat pillar extending in the longitudinal direction of the saddle is designed as a bent tube end of the seat pillar, forming a resilient region.

The slide principally may be of any desired form and of any design depending on the configuration of the saddle. When providing a saddle structure, steel bar sections are usually employed for the structure and in such cases the configuration advantageously is devised such that the slide is designed as a saddle stretcher formed by bars or as part of a saddle frame and that the bars are embraced by brackets connected with the seat pillar and adapted to fix the displacement position. Such a slide configuration formed by bars and overlapped by brackets, if appropriately designed, may again result in a defined resilience and hence in an improved comfort.

Figure 4:
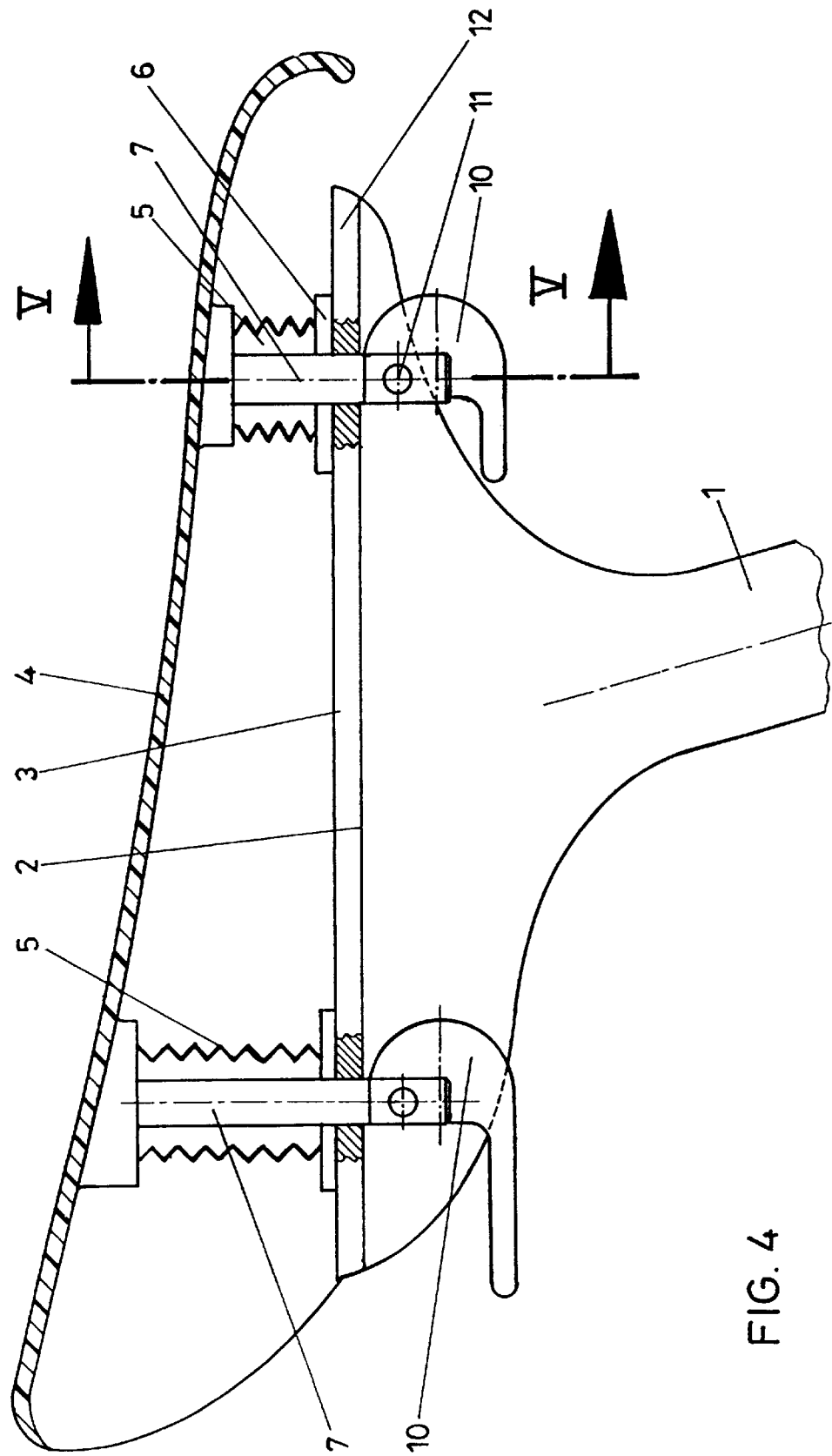
Figure 5:
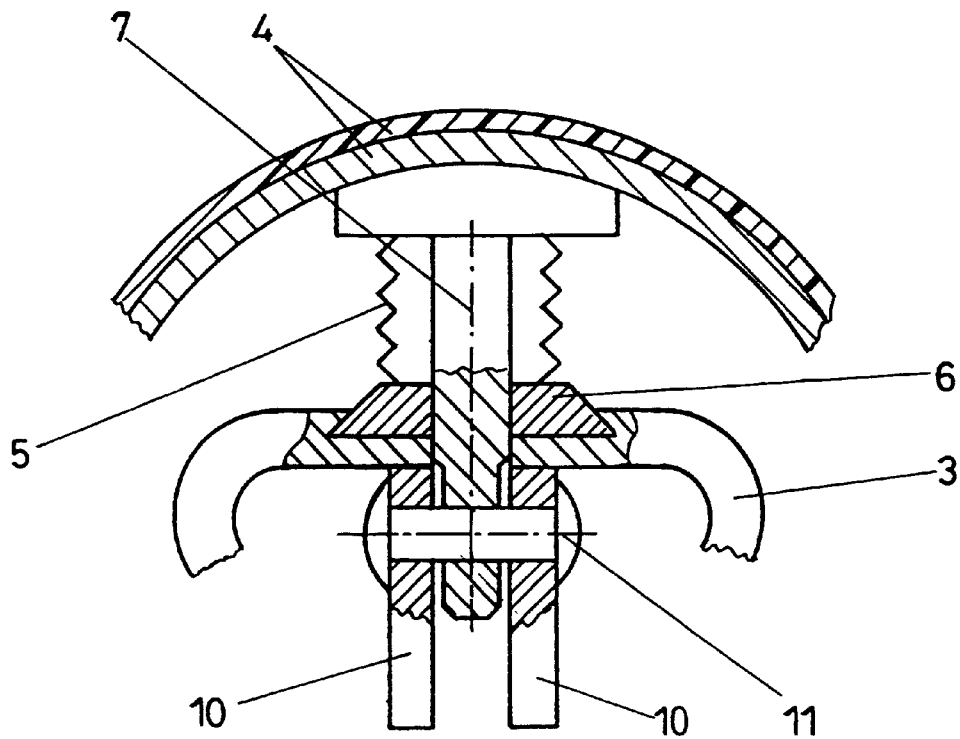
Figure 6:
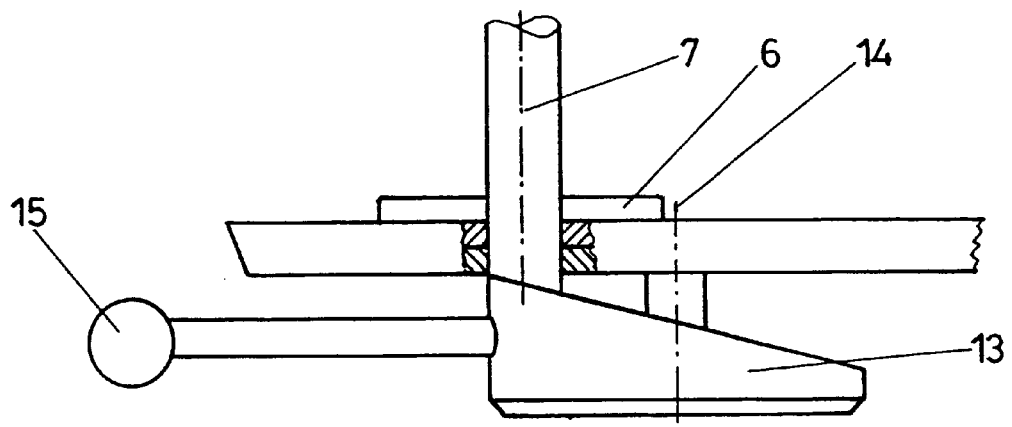

In the following, the invention will be explained in more detail by way of exemplary embodiments schematically illustrated in the drawing. Therein, FIG. 1 is a partially sectioned schematic side view of a first configuration of the saddle structure according to the invention, FIG. 2 is a modified configuration including a resilient seat pillar, FIG. 3 is a modified configuration using a saddle structure in an illustration analogous to FIGS. 1 and 2, FIG. 4 is a partially sectioned enlarged representation, FIG. 5 is a schematic illustration of the fastening of the height-adjustment bolt as well as the linear guide along section V—V of FIG. 4, and FIG. 6 is a modified configuration of the means for adjusting the height of the saddle.

In FIG. 1, 1 serves to denote a seat pillar which passes over into a plate-shaped support 2 for a linear guide. The linear guide is schematically indicated by 3 and formed by a slide guided in a groove. The saddle skin 4 in the configuration according to FIG. 1 is realized as a self-supporting saddle skin and supported on the slide 6 via damping elements 5. Height adjustment is effected via adjusting elements, such as, for instance nuts, engaging at the supports 7, which are designed as screw bolts, no detailed configuration of the adjusting elements being apparent from the illustration according to FIG. 1.

Figure 2:
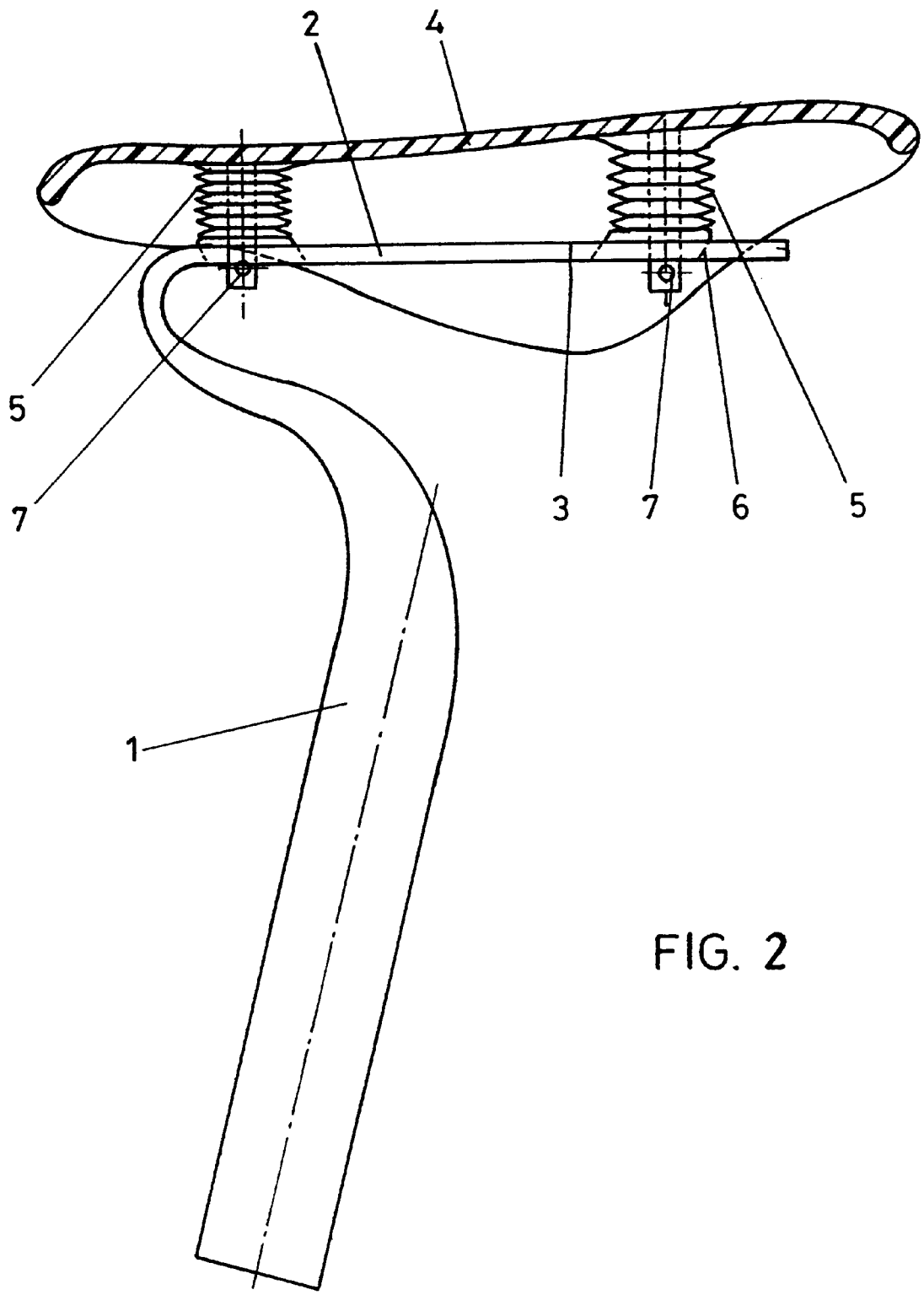

In the configuration according to FIG. 2, a saddle as depicted in FIG. 1 is used, yet with the supporting surface 2 for the linear guide being formed by a bent end region of the seat pillar 1.

Figure 3:
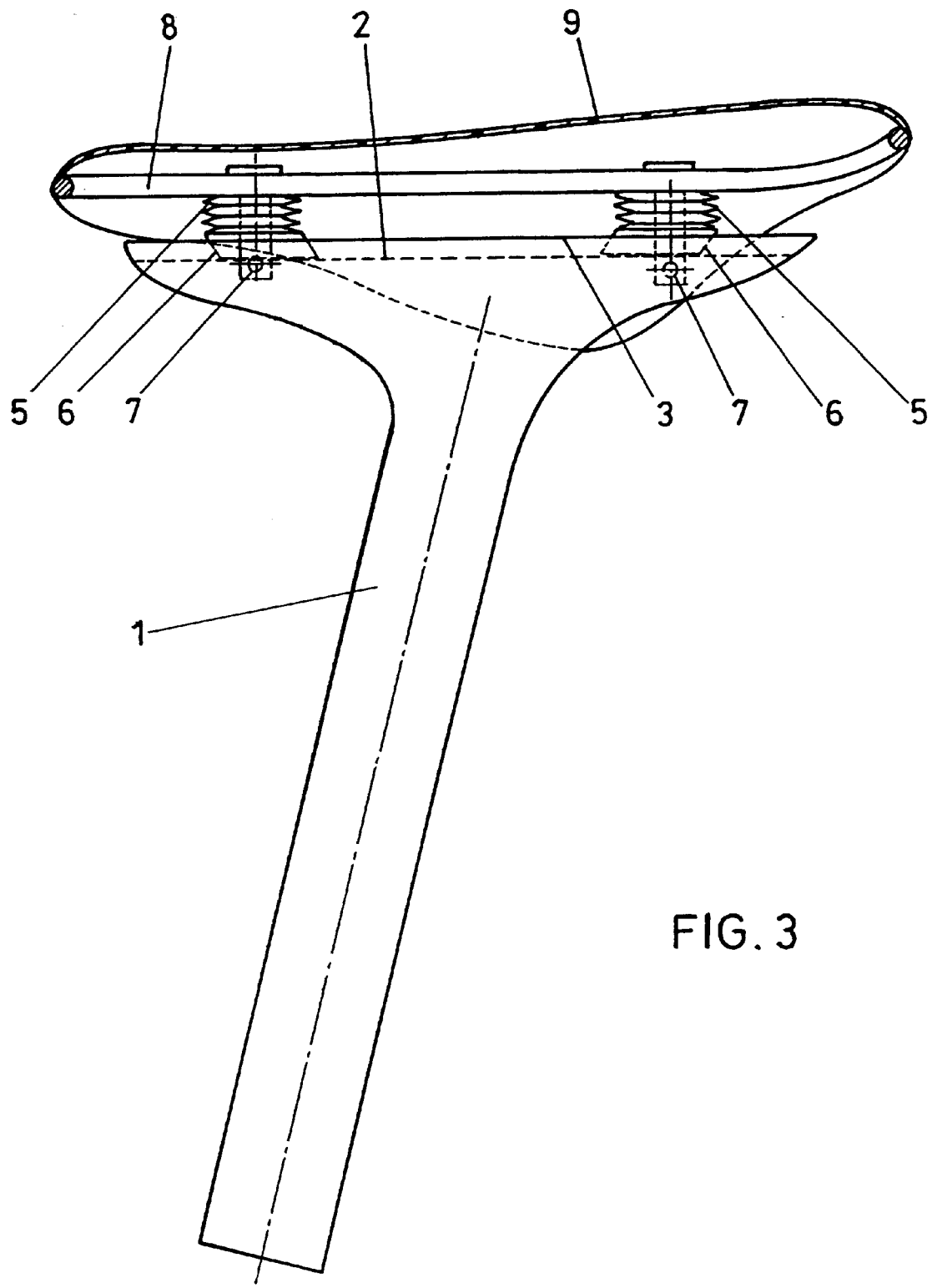

In the configuration according to FIG. 3, a saddle with a saddle frame 8 is employed, which saddle frame is connected with the supporting bolts 7 and the damping elements 5. The saddle skin is denoted by 9.

Also there, a linear guide 3 is again provided on the upper end of the seat pillar 1, wherein the linear guide may be realized either on the supporting surface 2 on the upper end of the seat pillar 1 or in the form of brackets overlapping parts of the saddle frame 8.

The design of the means for fixing the respective height position or displacement position of the saddle relative to the seat pillar are illustrated in more detail in FIGS. 4, 5, and 6. In FIG. 4 an eccentric comprising an eccentric disc 10 is provided for fixing the height-adjustable bolt 7. The axis of the eccentric is denoted by 11. By pivoting the eccentric, the respective height position of the saddle skin 4 may be adjusted relative to the bearing surface 2. The linear guide in this case is designed as a groove 12 extending in the longitudinal direction of the bearing surface 2 and in which a slide is displaceable. The slide is again denoted by 6. The slide may be moved with the eccentric being completely opened, positive and force-transmitting blocking against further displacement of the slide being feasible simultaneously with the adjustment of the desired height position.

The function of the eccentric is explained in even more detail in FIG. 5, from which it is apparent that the slide 6 has a substantially trapezoidal contour and the linear guide 3 is designed as a dove-tail-shaped groove. As for the rest, the reference numerals of the preceding Figures have been retained.

In the configuration according to FIG. 6, height adjustment is effected by a wedge surface of a disc 13 which may be pivoted about an axis 14 by means of a pivoting lever 15. The height-adjustable bolt 7 is brought into the respectively desired position as a function of the pivoted position of the disc 13 having the wedge surface, adjustment in this case being feasible in a particularly quick and simple manner.

With all of the preferred configurations illustrated in the drawing, two separate height-adjustment means are each arranged in the front and rear regions of the saddle. With the saddle being simultaneously displaceable in the longitudinal direction of the bicycle, such a separate arrangement of means for adjusting the height position in the front and rear regions of the saddle allows for the precise adaptation desired in any position of the saddle relative to the seat pillar and relative to a handlebar, respectively.

I claim:

1. A saddle construction for a bicycle comprising a seat pillar including a saddle support portion;
   a saddle adjustably mounted on said saddle support portion;
   a first height adjustment device extending between said saddle and said saddle support portion and located in a forward region of said saddle for adjusting the height of said forward region of said saddle relative to said saddle support portion; and
   a second height adjustment device extending between said saddle and said saddle support portion and located in a rearward region of said saddle for adjusting the height of said rearward region of said saddle; wherein said first and second height adjustment devices operate independently of each other to selectively either simultaneously or separately adjust the height at the forward and rearward regions of the saddle wherein said first and second height adjustment devices each include a vertically extending bolt.

2. The saddle construction of claim 1 wherein said saddle support portion includes a slide movable in forward and rearward directions.

3. The saddle construction of claim 1 wherein said saddle is supported above said saddle support portion by damping elements associated with each of said first and second height adjustment devices, respectively.

4. The saddle construction of claim 1 wherein each of said first and second height adjustment devices is actuated by one or more eccentric discs.

5. The saddle construction of claim 1 wherein each of said first and second height adjustment devices is actuated by a wedge.

6. The saddle construction of claim 1 wherein said saddle support portion extends in a longitudinal direction of said saddle.

7. The saddle construction of claim 1 wherein said saddle support portion comprises an integral and resilient, bent portion of said seat pillar.

8. The saddle construction of claim 1 wherein said saddle includes a frame and wherein said first and second height adjustment devices are connected to said frame.

9. A saddle construction for a bicycle comprising a seat pillar including a saddle support portion;
   a saddle adjustably mounted on said saddle support portion;
   a first height adjustment device extending between said saddle and said saddle support portion and located in a forward region of said saddle for adjusting the height of said forward region of said saddle relative to said saddle support portion; and
   a second height adjustment device extending between said saddle and said saddle support portion and located in a rearward region of said saddle for adjusting the height of said rearward region of said saddle; wherein said first and second height adjustment devices operate independently of each other to separately adjust the height at the forward and rearward regions of the saddle, and wherein said saddle support portion includes a slide movable in forward and rearward directions within a groove formed in said saddle support portion.

10. The saddle construction of claim 9 wherein said slide and said groove have a dovetail configuration.

11. The saddle construction of claim 9 wherein each of said first and second height adjustment devices each include means for simultaneously adjusting the height of said saddle and for locking said slide within said groove.

12. A saddle construction for a bicycle comprising a seat pillar including a saddle support portion;
   a saddle adjustably mounted on said saddle support portion;
   a first height adjustment device extending between said saddle and said saddle support portion and located in a forward region of said saddle for adjusting the height of said forward region of said saddle relative to said saddle support portion; and a second height adjustment device extending between said saddle and said saddle support portion and located in a rearward region of said saddle for adjusting the height of said rearward region of said saddle; wherein said first and second height adjustment devices operate independently of each other to separately adjust the height at the forward and rearward regions of the saddle said first and second height adjustment devices each include a vertically extending bolt, and further wherein the saddle and saddle support portion are not pivotally connected anywhere between the first and second height adjustment devices.

* * * * *